United States Patent Office 3,499,015
Patented Mar. 3, 1970

3,499,015
13-ETHYL-6-OXYGENATED STEROIDS
George H. Douglas, Paoli, Charles R. Walk, King of Prussia, and Herchel Smith, Wayne, Pa., assignors to American Home Products Corporation, New York, N.Y., a corporation of Delaware
No Drawing. Continuation-in-part of application Ser. No. 553,636, May 31, 1966. This application July 11, 1968, Ser. No. 743,980
Int. Cl. C07c *169/00*
U.S. Cl. 260—397.4          7 Claims

ABSTRACT OF THE DISCLOSURE

13β-polycarbonalkyl-17β-hydroxy-17α-alkyl- or alkynyl-3,6-dioxygenated gonane derivatives are prepared having hormonal activity.

---

The present application is a continuation-in-part of our application, Ser. No. 553,636, filed May 31, 1966, now abandoned.

This invention relates to and has for its objects the provisions of new physiologically active compounds, novel processes for their production and new intermediates useful in the preparation thereof.

More particularly, this invention relates to compounds of the formula:

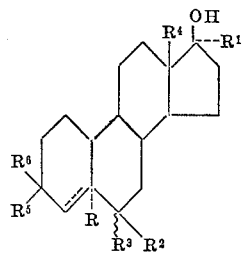

wherein the 4,5-position is saturated or double bonded; R is an alpha-hydroxy substituent only when ring A is saturated and provided $R^3$ is beta-hydroxy or beta-lower alkoxy; $R^1$ stands for hydrogen, ethynyl or an alkyl of less than six carbon atoms; $R^2$ is hydrogen; $R^3$ is selected from the group consisting of hydroxy, lower alkoxy and acyloxy, or together $R^2$ and $R^3$ are oxo (=O); $R^4$ is an alkyl group of 2 to 4 carbon atoms; $R^5$ is hydrogen; $R^6$ is selected from the group consisting of hydroxy, lower alkoxy, and acyloxy, or together $R^5$ and $R^6$ are oxo (=O); with the wavy bond at $R^3$ representing alpha or beta configuration; with the proviso that $R^3$ is beta only when R is a substituent.

Among the suitable alkoxy radicals may be mentioned methoxy, ethoxy, propoxy, butoxy, and the like. Among the suitable acyloxy substituents may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids (e.g., acrylic acid), the cycloalkane carboxylic acids (e.g., cyclobutane carboxylic acid), the cycloalkane carboxylic acids, the monocyclic aromatic carboxylic acids (e.g., benzoic acid), and the monocyclic aryl (lower alkanoic) acids (e.g., phenacetic and β-phenylpropionic acid).

The compounds of this invention can be prepared by employing the novel processes of this invention beginning with compounds of the formula:

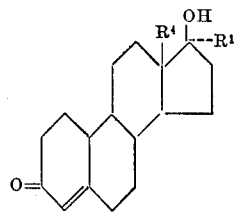

wherein $R^1$ and $R^4$ are as hereinbefore defined, as starting material.

The compounds of this invention may be prepared according to the process of this invention which may be represented by the following reaction sequence wherein $R^1$ and $R^4$ are as hereinbefore defined:

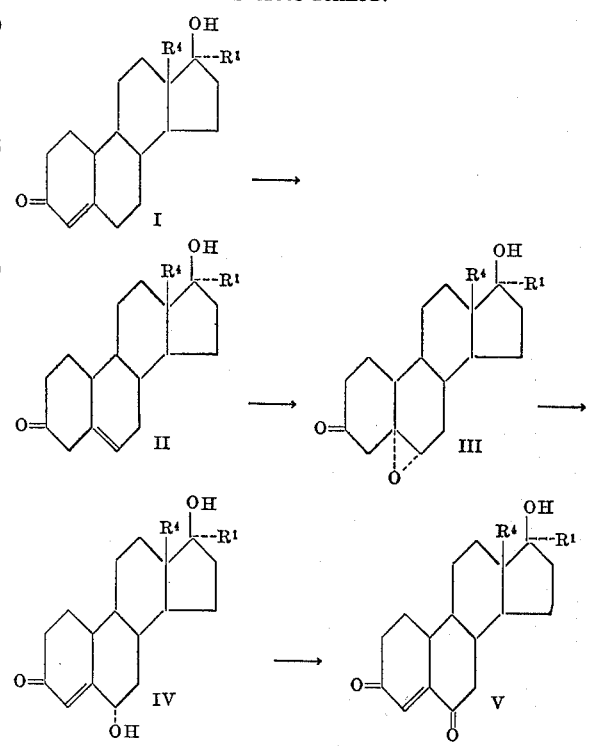

In the first step of this invention, 13-lower alkyl-17α-lower alkyl-17-hydroxygon-4-en-3-one (Compound I) is treated with an alkoxide of an alkali metal (e.g., potassium t-butoxide) in an inert solvent and then acidified to yield the 13-lower alkyl-17α-lower alkyl-17-hydroxygon-5-en-3-one (Compound II).

Compound II is then interacted with an organic peracid (e.g., perbenzoic acid, haloperbenzoic acid, perphthalic acid and per (lower alkanoic) acids), in an inert medium to yield inter alia, the 5,6-epoxide compound (Compound III).

These epoxide compounds are then opened by a method such as heating under reflux conditions in an inert organic solvent for a period of about 15 to 25 hours or by heating under reflux conditions in the presence of an acid such as m-chlorobenzoic acid to yield the 6α-hydroxy steroid (Compound IV) of this invention. The 6α-hydroxy steroid may be treated with an oxidizing agent such as chromic acid to yield the 6-oxo steroid (Compound V), which is also a final product of this invention.

The 6α-hydroxy compounds (IV) of this invention may be acylated to the corresponding 6-ester steroids as shown in the following reaction step:

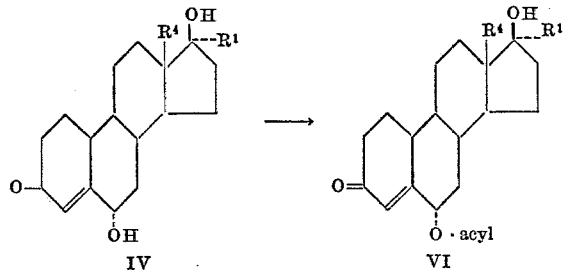

Thus, to prepare the 6-acyloxy derivatives (VI) wherein the acyl radical corresponds to the acyl radical of a hydrocarbon carboxylic acid of less than twelve carbon atoms, either the acyl halide or acid anhydride of a lower alkanoic acid, lower alkenoic acid, monocyclic aryl carboxylic acid, monocyclic aryl lower alkenoic acid, cycloalkane carboxylic acid or cycloalkene carboxylic acid is employed as a reactant.

In order to prepare 3-hydroxy-6-oxygenated derivatives, for example, Compound VII shown below, the corresponding 3-keto steroid may be reduced with a reducing agent such as a metal hydride (e.g., lithium aluminum hydride) or an alkali metal borohydride (e.g., sodium borohydride). Such a reaction step may be illustrated as follows:

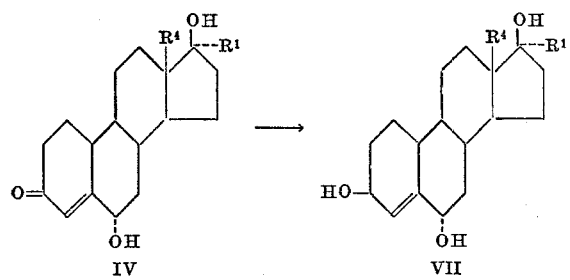

It is also possible to prepare 6β-oxygenated compounds. These compounds may be prepared according to the following reaction sequence from Compound III:

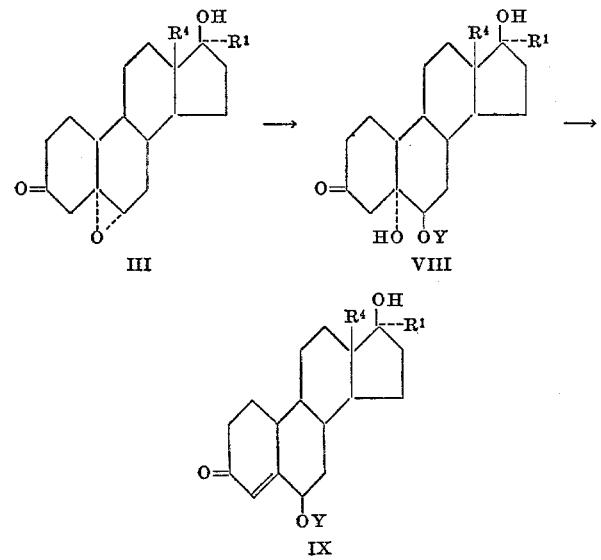

In the above reactions, the 5,6-epoxide steroid (III) is treated with oxalic acid dihydrate and a lower alkanol, forming Compound VIII, in which the symbol Y represents the lower alkyl residue of an alkanol reactant. When Compound VIII is reacted with dilute hydrochloric acid in ethanol, the 6β-alkoxy-gon-4-ene is formed (Compound IX), Y having the same meaning as before.

Additionally, the 5,6-epoxide steroid (III) may be treated with oxalic acid in an aqueous medium to produce a 5α,6β,17β-trihydroxy gonane (X) which is useful as an intermediate for preparing a 3-keto-6α-hydroxy-gon-4-ene according to the following reaction sequence:

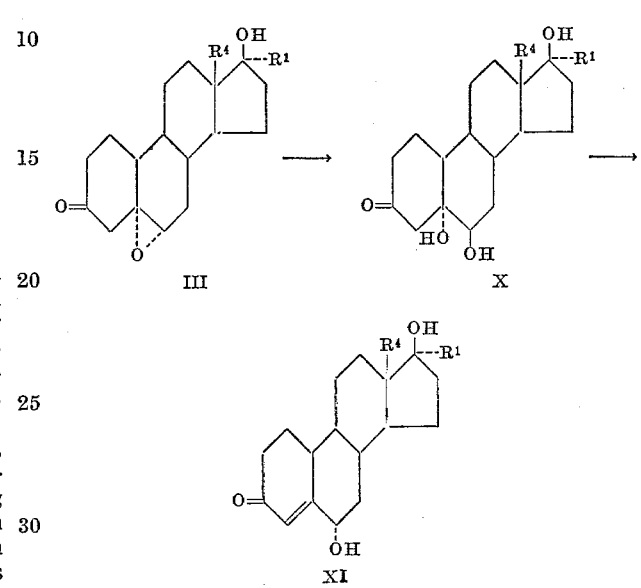

Thus, the trihydroxy Compound X, prepared as indicated above, may be reacted with dilute hydrochloric acid in ethanol, producing the Compound XI which is the 3-keto-6α-hydroxy-gon-4-ene mentioned above.

The following examples illustrate the invention (all temperatures being in centigrade).

EXAMPLE 1

13,17α-diethyl-17-hydroxygon-5-en-3-one

To 1.0 gm. of 13,17α-diethyl-17-hydroxygon-4-en-3-one dissolved in 20 ml. of dry diglyme is added 3.75 gm. of potassium t-butoxide. The mixture is stirred under nitrogen at room temperature for a period of about 90 minutes.

125 ml. of ice cold 10% aqueous acetic acid is added rapidly to the mixture and then the mixture is poured into a saturated sodium bicarbonate solution and extracted with ether. The ether extract is washed with brine, dried with sodium sulfate and evaporated to dryness under vacuum. The residue is crystallized from acetonitrile to yield 0.595 gm. of 13,17α-diethyl-17 1hydroxygon-5-en-3-one having a melting point about 165–173°.

$\lambda_{max.}^{EtOH}$ 2.40 m ($\epsilon$=1,265) due to 7.6% of starting material.

$\lambda_{max.}^{KBr}$ 2.90

5.87, 8.46, and 10.23μ.

EXAMPLE 2

13-ethyl-17α-butyl-17-hydroxygon-5-en-3-one

Following the procedure of Example 1 but substituting 13-ethyl-17α-butyl-17-hydroxygon-4-en-3-one for 13,17α-diethyl-17-hydroxygon-4-en-3-one there is obtained 13-ethyl-17α-butyl-17-hydroxygon-5-en-3-one.

EXAMPLE 3

13,17α-dipropyl-17-hydroxygon-5-en-3-one

Following the procedure of Example 1 but substituting 13-propyl-17α-propyl-17-hydroxygon-4-en-3-one for 13,17α-diethyl-17-hydroxygon-4-en-3-one there is obtained 13,17α-dipropyl-17-hydroxygon-5-en-3-one.

EXAMPLE 4

13-ethyl-17-hydroxygon-5-en-3-one

Following the procedure of Example 1 but substituting 13-ethyl-17-hydroxygon-4-en-3-one for 13,17α-diethyl-17-hydroxygon-4-en-3-one there is obtained 13-ethyl-17-hydroxygon-5-en-3-one.

EXAMPLE 5

5α,6α-epoxy-13,17α-diethyl-17-hydroxygonan-3-one

To 500 mg. of 13,17α-diethyl-17-hydroxygon-5-en-3-one dissolved in 25 ml. of benzene is added 318 mg. of m-chloroperbenzoic acid in 25 ml. of benzene. The mixture is stirred for 20 minutes at room temperature and poured into an aqueous sodium bicarbonate solution. The organic layer is separated, washed with water and dried with sodium sulfate. The solvent removed and the residue is crystallized from ether to yield 250 mg. of 5α,6α-epoxy - 13,17α - diethyl-17-hydroxygonan-3-one having a melting point of about 137–140°;

$$\lambda_{max.}^{KBr} \ 2.97$$

and 5.84μ.

*Analysis.*—Calcd. for $C_{21}H_{32}O_3$ (percent): C, 75.86; H, 9.70. Found (percent): C, 75.71; H, 9.98.

EXAMPLE 6

5α,6α-epoxy-13-ethyl-17α-butyl-17-hydroxygonan-3-one

Following the procedure of Example 5 but substituting 13-ethyl-17α-butyl-17-hydroxygon-5-en-3-one for 13,17α-diethyl-17-hydroxygon-5-en-3-one there is obtained 5α,6α-epoxy-13-ethyl-17α-butyl-17-hydroxygonan-3-one.

EXAMPLE 7

5α,6α-epoxy-13,17α-dipropyl-17-hydroxygonan-3-one

Following the procedure of Example 5 but substituting 13,17α-dipropyl-17-hydroxygon-5-en-3-one for 13,17α-diethyl-17-hydroxygon-5-en-3-one there is obtained 5α,6α-epoxy-13,17α-dipropyl-17-hydroxygonan-3-one.

EXAMPLE 8

5α,6α-epoxy-13-ethyl-17-hydroxygonan-3-one

Following the procedure of Example 5 but substituting 13-ethyl-17-hydroxygon-5-en-3-one for 13,17α-diethyl-17-hydroxygon-5-en-3-one there is obtained 5α,6α-epoxy-13-ethyl-17-hydroxygonan-3-one.

EXAMPLE 9

13,17α-diethyl-6α,17-dihydroxygon-4-en-3-one

To 7.0 gm. of 13,17α-diethyl-17-hydroxygon-5-en-3-one dissolved in 250 ml. of benzene is added 4.25 gm. of m-chloroperbenzoic acid in 100 ml. of benzene. The mixture is stirred at room temperature for 20 minutes to form the 5α,6α-epoxide and then refluxed for 20 hours. The mixture is then cooled and poured into an aqueous bicarbonate solution. The organic layer is separated, washed with water, dried and the solvent removed under vacuum. The solid residue is recrystallized from methanol-ethyl acetate to yield 4.44 gm. of 13,17α-diethyl-6α,17-dihydroxygon-4-en-3-one having a melting point of about 228–231°.

$$\lambda_{max.}^{KBr} \ 3.05$$

6.04, and 6.19μ.

$$\lambda_{max.}^{EtOH} \ 244 \ m\mu$$

($\epsilon$=14,900). τ7.92 (m., 4–H).

*Analysis.*—Calcd. for $C_{21}H_{32}O_3$: C, 75.86%; H, 9.70%. Found: C, 75.86%; H, 9.65%.

EXAMPLE 10

13-ethyl-17α-butyl-6α,17-dihydroxygon-4-en-3-one

To 7.0 gm. of 5α,6α-epoxy-13-ethyl-17α-butyl-17-hydroxygonan-3-one dissolved in 250 ml. of benzene is added 4.3 gm. of m-chlorobenzoic acid in 100 ml. of benzene. The mixture is stirred at room temperature for 20 minutes and then refluxed for 20 hours. The mixture is cooled and then poured into an aqueous sodium bicarbonate solution. The organic phase is separated and the solvent is removed under vacuum to yield 13-ethyl-17α-butyl-6α,17-dihydroxygon-4-en-3-one.

EXAMPLE 11

13,17α-dipropyl-6α,17-dihydroxygon-4-en-3-one

Following the procedure of Example 9 but substituting 13,17α-dipropyl-17-hydroxygon-5-en-3-one for 13,17α-diethyl-17-hydroxygon-5-en-3-one there is obtained 13,17α-dipropyl-6α,17-dihydroxygon-4-en-3-one.

EXAMPLE 12

13-ethyl-6α,17-dihydroxygon-4-en-3-one

Following the procedure of Example 9 but substituting 13-ethyl-17-hydroxygon-5-en-3-one for 13,17α-diethyl-17-hydroxygon-5-en-3-one there is obtained 13-ethyl-6α,17-dihydroxygon-4-en-3-one.

EXAMPLE 13

13,17α-diethyl-6α,17-dihydroxygon-4-en-3-one,6-acetate

To 150 mg. of 13,17α-diethyl-6α,17-dihydroxygon-4-en-3-one in 5 ml. of pyridine is added 1 ml. of acetic anhydride. The mixture is stirred at room temperature for 24 hours.

Methanol is added to the mixture which is then added to water and extracted with ether. The organic layer is washed with water, 2% sulfuric acid solution, dried and then the solvent is removed under vacuum to yield 90 mg. of 13,17α-diethyl-6α,17-dihydroxygon-4-en-3-one,6-acetate having a melting point of about 136–138°;

$$\lambda_{max.}^{KBr} \ 2.95$$

5.74, 6.03, 6.16 and 8.10μ;

$$\lambda_{max.}^{EtOH} \ 240 \ m\mu$$

($\epsilon$=14,220); τ CDCl$_3$ 4.06 (m., 4–H).

In similar manner by substituting any other acid anhydride or acyl chloride for the acetic anhydride in the procedure of Example 13, the corresponding ester is formed.

Similarly the compounds of Examples 10 through 12 may be converted to their acetate derivatives.

EXAMPLE 14

13,17α-diethyl-17-hydroxygon-4-en-3,6-dione

To 2.5 gm. of 13,17α-diethyl-6α,17-dihydroxygon-4-en-3-one dissolved in 500 ml. of acetone and cooled at 0° C., is added 2.5 ml. of 8 N chromic acid. The reaction mixture is stirred for 10 minutes, 12.5 ml. of isopropanol is added and the mixture is poured into water. The organic layer is dried and then washed through a column of neutral alumina with ether. The solvent is evaporated under vacuum and the solid residue is triturated with ether to yield 1.85 gm. of 13,17α-diethyl-17-hydroxygon-4-en-3,6-dione having a melting point of about 168–171°;

$$\lambda_{max.}^{KBr} \ 2.85$$

5.96, and 6.25μ.

$$\lambda_{max.}^{EtOH} \ 258 \ m\mu$$

($\epsilon$=10,320); CDCl$_3$ 3.54 (d., 4–H) (J=2 cps.).

*Analysis.*—Calcd. for $C_{21}H_{30}O_3$: C, 76.32%; H, 9.15%. Found: C, 76.19%; H, 9.08%.

Oxidation of the products of Examples 10 and 11 with chromic acid according to the procedure of Example 14 gives, respectively, the products of the following Examples 15 and 16.

| Example No. | Starting material is the product of Example No. | Product |
|---|---|---|
| 15 | 10 | 13-ethyl-17α-butyl-17-hydroxygon-4-en-3,6-dione. |
| 16 | 11 | 13,17α-dipropyl-17-hydroxygon-4-en-3,6-dione. |

EXAMPLE 17

13,17α-diethyl-3,6α,17β-trihydroxygon-4-ene

To 0.5 gm. of 13,17α-diethyl-6α,17-dihydroxygon-4-en-3-one in 50 ml. of methanol is added an excess of sodium borohydride. The mixture is stirred at room temperature for 2 hours and poured into water. The mixture is extracted with ether. The organic phase is washed with water and the solvent is removed under vacuum. The solid residue is recrystallized from ethyl acetate to yield 75 mg. of 13,17α-diethyl-3,6α,17β-trihydroxygon-4-ene having a melting point of about 242–247°;

$$\lambda_{max.}^{KBr}\ 3.07$$

and 6.91μ.

Analysis.—Calcd. for $C_{21}H_{34}O_3$: C, 75.40%; H, 10.25%. Found: C, 74.63%; H, 9.92%.

Similarly the products of Examples 10 through 12 may be reduced with sodium borohydride to yield the respective 3,6,17-trihydroxylated compound.

EXAMPLE 18

13,17α-diethyl-5α,6β,17β-trihydroxygonan-3-one

To a solution of 0.150 gm. of 13,17α-diethyl-5α,6α-epoxy-17-hydroxygonan-3-one in 25 ml. of tetrahydrofuran is added 0.10 gm. of oxalic acid in 25 ml. of water. The mixture is stirred 2 hours poured into water and extracted with ether.

The ether extract is washed with water, dried, and the solvent is evaporated in vacuo. The residue is crystallized from acetone to yield 0.06 gm. of 13,17α-diethyl-5α,6β,17β-trihydroxy-gonan-3-one having a melting point of about 266–268°;

$$\lambda_{max.}^{KBr}\ 3.03$$

and 5.85μ.

Analysis.—Calcd. for $C_{21}H_{34}O_4$: C, 71.90%; H, 9.78%. Found: C, 71.77%; H, 9.43%.

EXAMPLE 19

13,17α-diethyl-17-hydroxy-6β-methoxygon-4-en-3-one (a) Preparation of 13,17α-diethyl-5α-17-dihydroxy-6β-methoxygonan-3-one.—To 0.5 gm. of 13,17α-diethyl-5α-6α-epoxy-17-hydroxygonan-3-one in 50 ml. of methanol is added 0.5 gm. of oxalic acid dihydrate in 50 ml. of methanol. The mixture is stirred for 30 minutes poured into aqueous sodium bicarbonate and then extracted with ether. The organic layer is washed with water, dried and the solvent is evaporated in vacuo. The residue is crystallized from ether to yield 0.14 gm. of 13,17α-diethyl-5α-17-dihydroxy-6β-methoxygonan-3-one having a melting point of about 182–185°;

$$\lambda_{max.}^{KBr}$$

3.02 and 5.86μ.

Analysis.—Calcd. for $C_{22}H_{36}O_4$: C, 72.49%; H, 9.96%. Found: C, 72.49%; H, 9.88%.

(b) Preparation of 13,17α-diethyl-17-hydroxy-6β-methoxygon-4-en-3-one.—To 1.07 mg. of 13,17α-diethyl-5α-17-dihydroxy-6β-methoxy-gonan-3-one dissolved in 100 ml. of 95% ethanol is added 1 ml. of concentrated hydrochloric acid. The mixture is allowed to stand at room temperature for 20 hours and then extracted with ether. The ether extract is evaporated in vacuo to yield 13,17α-diethyl-17-hydroxy-6β-methoxygon-4-en-3-one;

$$\lambda_{max.}^{EtOH}+HCl\ 242$$

318, and 366 (ε=11,570, 1,365, and 1,700).

Similarly the 5α,6α-epoxy compounds of Examples 6 through 9 may be converted to their corresponding 5α-hydroxy and 6β-methoxy derivatives.

Similarly by following the procedure of Example 19, but substituting ethanol, propanol, butanol, and the like, for methanol, the corresponding 6β-ethoxy, 6β-propoxy, and 6β-butoxy derivatives may be prepared.

The 6-keto and the 6α-oxygenated gon-4-enes of the invention are physiologically active substances found to possess significant progestational activitiy and therefore useful experimentally in warm-blooded animals, for example, female rabbits, and may also be used in comparing such actions with other or known steroidal compounds having generally similar or possibly equivalent chemical structure. The standard Clauberg test procedure may be followed in determining progestational activity.

The saturated gonanes are useful as intermediates from which 6α-oxygenated-gon-4-enes may be prepared as already described and having the utility indicated above.

In using the active compounds of the invention, they may be formulated in essentially the same manner as the known progestational agents, as for example, progesterone, the concentration and/or dosage being based on the activity of the compound selected.

The invention may be variously otherwise embodied within the scope of the appended claims.

The invention that is claimed is:

1. A compound having the formula:

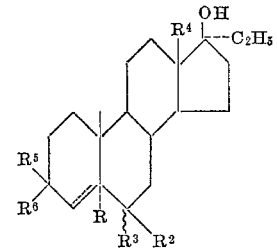

in which R is hydroxy when the A ring is saturated and $R^3$ is beta-hydroxy; $R^2$ is hydrogen; $R^3$ is hydroxy, acetoxy, or $R^2$ and $R^3$ together are oxo; $R^4$ is ethyl; $R^5$ is hydrogen; $R^6$ is hydroxy, or $R^5$ and $R^6$ together are oxo; the dotted line indicating that the 4,5-position may be single or double bonded, and the wavy line indicating an alpha or beta configuration; with the proviso that said wavy line is alpha when the A-ring is unsaturated and it is beta only when the A-ring is saturated and R is alpha-hydroxy.

2. A compound of claim 1; having the formula:

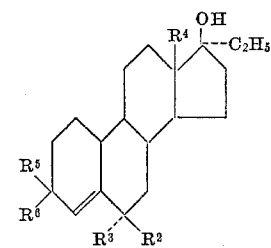

in which $R^2$ is hydrogen; $R^3$ is hydroxy or acetoxy or $R^2$ and $R^3$ together are oxo; $R^4$ is ethyl; $R^5$ is hydrogen; $R^6$ is hydroxy or $R^5$ and $R^6$ together are oxo.

3. As a compound of claim 1; 13,17α-diethyl-6α,17-dihydroxygon-4-en-3-one.

4. As a compound of claim 1; 13,17α-diethyl-6α,17-dihydroxygon-4-en-3-one,6-acetate.

5. As a compound of claim 1; 13,17α-diethyl-17-hydroxygon-4-en-3,6-dione.

6. As a compound of claim 1; 13,17α-diethyl-3,6α,17-trihydroxygon-4-ene.

7. As a compound of claim 1; 13,17α-diethyl-5α,6β,17β-trihydroxygonan-3-one.

References Cited

UNITED STATES PATENTS

| | | | |
|---|---|---|---|
| 2,312,344 | 3/1943 | Logemann | 260—239.55 |
| 3,004,045 | 10/1961 | Zeelen | 260—397.4 |
| 3,032,565 | 5/1962 | Dodson et al. | 260—397.4 |
| 3,231,589 | 1/1966 | Greenspan | 260—397.4 |

LEWIS GOTTS, Primary Examiner

ETHEL G. LOVE, Assistant Examiner

U.S. Cl. X.R.

260—239.55, 397.5, 999

PO-1050
(5/69)

UNITED STATES PATENT OFFICE
CERTIFICATE OF CORRECTION

Patent No. 3,499,015          Dated   March 3, 1970

Inventor(s) George H. Douglas, Charles R. Walk, Herchel Smith

It is certified that error appears in the above-identified patent and that said Letters Patent are hereby corrected as shown below:

Claim 1 should read:

A compound having the formula:

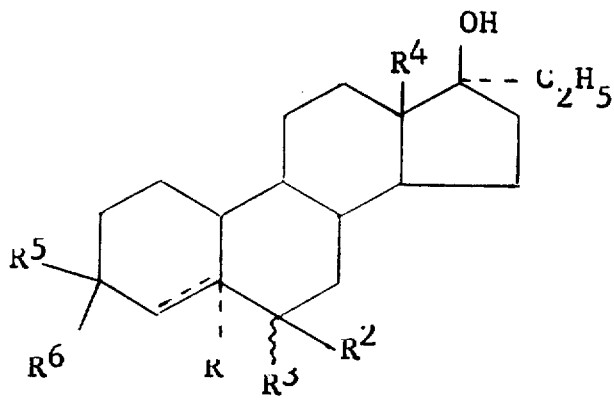

in which R is hydroxy when the A ring is saturated and $R^3$ is beta-hydroxy; $R^2$ is hydrogen; $R^3$ is hydroxy, acetoxy, or $R^2$ and $R^3$ together are oxo; $R^4$ is ethyl; $R^5$ is hydrogen; $R^6$ is hydroxy, or $R^5$ and $R^6$ together are oxo; the dotted line indicating that the 4,5-position may be single or double bonded, and the wavy line indicating an alpha or beta configuration; with the proviso that said wavy line is alpha when the A-ring is unsaturated and it is beta only when the A-ring is saturated and R is alpha-hydroxy.

SIGNED AND
SEALED
AUG 18 1970

(SEAL)
Attest:

Edward M. Fletcher, Jr.
Attesting Officer

WILLIAM E. SCHUYLER, JR.
Commissioner of Patents